United States Patent
Goto

(10) Patent No.: US 7,436,906 B2
(45) Date of Patent: Oct. 14, 2008

(54) SYNCHRONOUS DETECTOR WITH HIGH ACCURACY IN DETECTING SYNCHRONIZATION AND A METHOD THEREFOR

(75) Inventor: Masao Goto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 565 days.

(21) Appl. No.: 11/094,159

(22) Filed: Mar. 31, 2005

(65) Prior Publication Data

US 2005/0226350 A1    Oct. 13, 2005

(30) Foreign Application Priority Data

Apr. 13, 2004  (JP) ............................ 2004-117463

(51) Int. Cl.
*H03K 9/00*    (2006.01)

(52) U.S. Cl. .................. 375/316; 375/219; 375/295; 327/141; 358/409; 455/73; 370/503; 713/400; 714/12

(58) Field of Classification Search .............. 375/316, 375/219, 295; 327/141; 358/409; 370/503; 713/400; 714/12
See application file for complete search history.

(56) References Cited

U.S. PATENT DOCUMENTS 6,646,980 B1 *  11/2003  Yamamoto et al. .......... 370/208
6,658,063 B1 *  12/2003  Mizoguchi et al. .......... 375/260
7,039,000 B2 *   5/2006  You et al. .................... 370/203
2004/0052319 A1 *  3/2004  Wakamatsu ................. 375/343
2004/0247044 A1 * 12/2004  Matsushita et al. .......... 375/316

OTHER PUBLICATIONS

Hideaki Matsue et al., "802.11 High-speed Wireless LAN Textbook", IDG (International Data Group) Japan, pp. 189-191, 2003.

* cited by examiner

*Primary Examiner*—David C. Payne
*Assistant Examiner*—Zewdu Kassa
(74) *Attorney, Agent, or Firm*—Studebaker & Brackett PC; Donald R. Studebaker

(57) ABSTRACT

In a symbol timing detector, a correlator calculates a correlation value for a received radio packet signal. A peak detector compares the correlation value with a threshold value to be used, and sends, upon a correlation value detected larger than the threshold value, a detection signal to a symbol synchronous processor. A threshold value to be used for the peak detector is set different, after the first peak detected, between a predetermined estimation period and a period other than the former. A first peak is detected with a threshold value under a severer condition in the period other than the estimation period, and the next peak detection timing is estimated upon the first peak detected. A synchronization detecting position is determined, when no correlation peak is detected at the estimated timing, to output a sync detection signal.

6 Claims, 3 Drawing Sheets

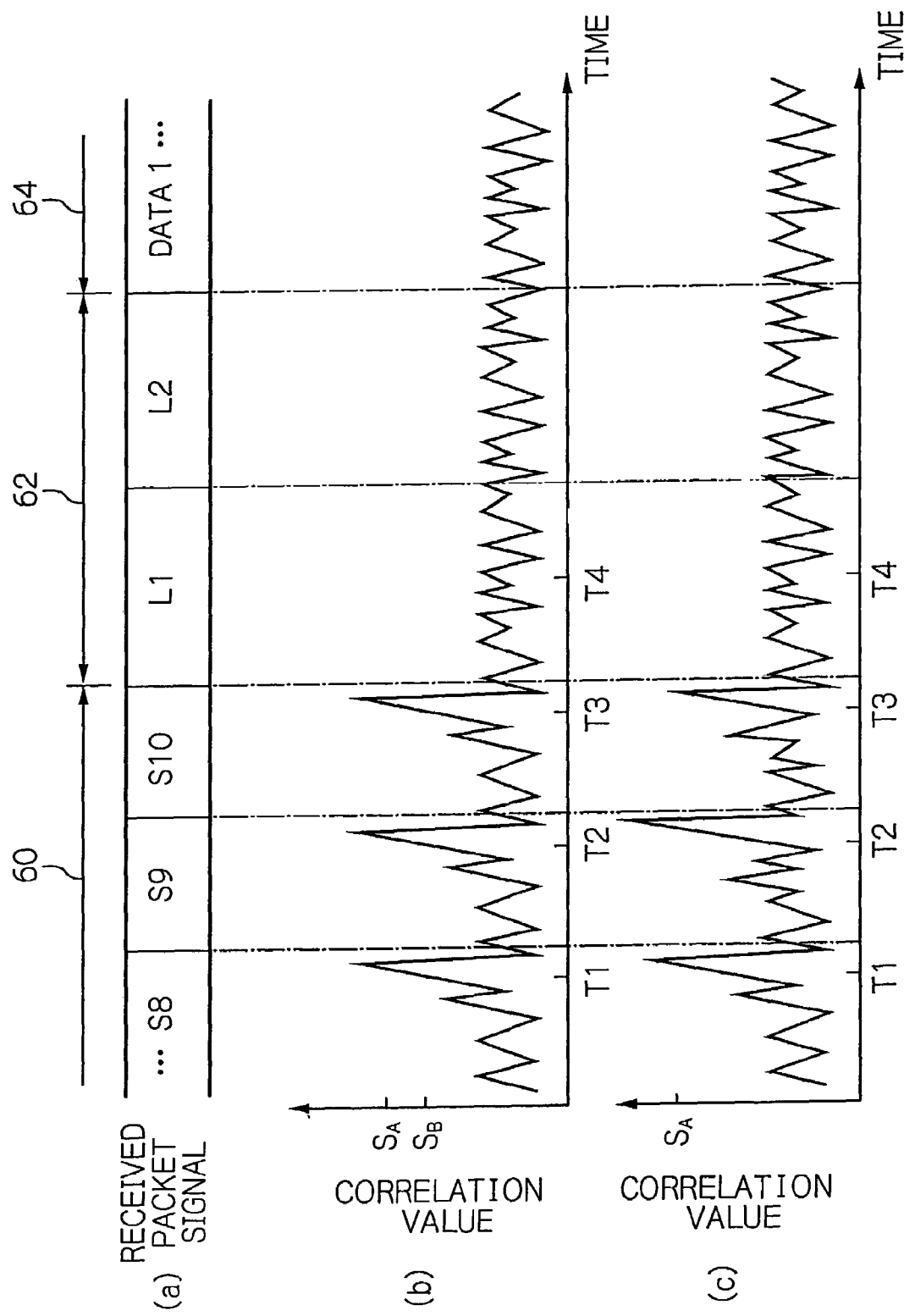

SYNCHRONOUS DETECTOR WITH HIGH ACCURACY IN DETECTING SYNCHRONIZATION AND A METHOD THEREFOR

BACKGROUND OF THE INVENTION

1. Field of the Invention

The present invention relates to a synchronous detector and a method therefor. The present invention relates in particular to a symbol timing synchronous detector circuit to be mounted on a demodulator for use in a burst transmission system, such as a wireless local area network (LAN) based upon an orthogonal frequency division multiplexing (OFDM) modulation system. Further, the present invention relates to a method of detecting symbol synchronization used for example in demodulation by an OFDM demodulator.

2. Description of the Background Art

A communication terminal for use in a wireless LAN transmits and receives signals in a packet mode in which signals are conveyed by packets to be transmitted. In a packet mode, a preamble is provided at the top part of the packet. The preamble is used for synchronizing frequency and symbol timing.

A packet mode will be further described. An OFDM packet prescribed in IEEE (Institute of Electrical and Electronics Engineers) 802.11a, the international standards for wireless LAN, includes a preamble, signals and data. The preamble includes a short preamble including short symbols and a long preamble including long symbols. The short preamble includes ten short symbols forming a specific pattern and contributes to establishment of synchronizing frequency, symbol timing and carrier frequency, etc. in the OFDM system. Also, the symbol timing synchronization is established by detecting OFDM symbol timing. Such synchronization is used in demodulation of OFDM burst signals.

The short symbols are arranged followed by the long symbols. The long symbols are used in channel estimation in which a propagation channel is estimated for estimating the phase and amplitude of each sub-carrier distorted on the propagation channel.

There is a method of utilizing a preamble based on such a specific format to establish symbol timing synchronization. The method performs operation of complex correlation using a received signal and a known specific pattern, and compares an obtained correlation value with a predetermined threshold value to detect a peak of the correlation from the comparison. The correlation peak detection corresponds to detection of each of the ten short symbols included in the short preamble. The symbol timing synchronization means to detect a boundary position between a short preamble and a long preamble as synchronization timing so as to obtain a sync detection signal. In order to obtain a sync detection signal, the method further determines, after the elapse of a predetermined period of time from the correlation peak detection, whether or not a correlation peak is detected. When a correlation peak is not detected, then it is determined that the reception of the packet has moved to its long preamble to determine its boundary position, thereby outputting a symbol timing sync signal. The symbol timing synchronization is established in that procedure. A predetermined period of time is in the context determined as corresponding for example to a period of time for a short preamble.

In the determination according to the method stated above, symbol timing synchronization is established on the basis of the failure to detect a correlation peak at an expected timing. It is therefore desirable to correctly detect a correlation peak with a symbol immediately preceding thereto in the repetitive pattern included in a short preamble, i.e. with the tenth short symbol. If the correlation peak should not correctly be detected, symbol timing synchronization cannot be established at a correct timing. As seen from this method in which timing is obtained from the comparison between a correlation value calculated by correlation peak detection and a predetermined threshold value, it is important for detection of a correct correlation peak to set a predetermined threshold value.

In view of the importance stated above, it could be considered that setting a predetermined threshold value to a lower level facilitates detection of a correlation peak. However, it has been known that when a predetermined threshold value is set to such a lower level, higher accuracy cannot be attained on symbol timing synchronization. Such setting tends to render synchronization detection too sensitive to noise and multiple pass on a propagation channel. In particular, the latter, multiple pass propagation, makes the detection difficult due to the distortion of signal waveforms caused by multi-superimposition of delayed incoming waves. As a result, such setting increases the probability in detecting a correlation peak at incorrect timing, which causes to deteriorate the accuracy in symbol timing synchronization.

An OFDM demodulator disclosed in U.S. Pat. No. 6,646,980 B1 to Yamamoto et al detects a short symbol and narrows a detecting window step by step on the basis of the detection to determine timing not exceeding a predetermined threshold value, thereby improving the accuracy in the timing detection.

Further, an OFDM demodulator in U.S. Pat. No. 6,658,063 B1 to Mizoguchi et al, which has, in particular, three threshold circuits provided in a timing decision circuit. Two of the threshold circuits determine whether or not a preamble signal exists before one or two unit periods of time, when the respective input signals in the threshold circuits exceed the threshold value, while the remaining threshold circuit determines whether or not values indicated by the current output signals from a correlator have lowered by a predetermined percent or more compared to the values before one unit period of time. A logic circuit decides, when the result from all those threshold circuits are true, that a time position of the end of the preamble has been detected, thereby providing a highly accurate detection of symbol timing synchronization.

Both documents disclose that an examination on time conditions in synchronization detection could raise accuracy in timing detection. However, it discloses or suggests nothing about determination based on a signal level.

SUMMARY OF THE INVENTION

It is an object of the present invention to provide a synchronous detector and a method therefor in which error caused by failure to detect a correlation peak can be reduced in detecting symbol timing synchronization, thereby heightening the detection accuracy.

In accordance with the present invention, a synchronous detector includes an arithmetic correlator for obtaining a correlation value between a complex baseband signal represented in a complex number supplied and a pre-stored pattern signal positioned at the head of the complex baseband signal, a peak detector for comparing the correlation value to a threshold value which is to be used among a plurality of threshold values, and for determining, when one of the correlation values is detected which is larger than the threshold value to be used, a peak of the correlation values, and a synchronization determining circuit operative in response to the peak determined for estimating the timing at which the peak of the correlation values comes next, and for monitoring determination of a peak of the correlation values at the timing estimated to determine a synchronization timing with the pattern signal to output a sync detection signal, the threshold value to be used being set to a value under a severer condition in a first period of time than in a second period of time, the second period of time extending from determining the peak first to an elapse of a predetermined period of time, the first period of time being other than the second period of time, whereby the threshold value to be used is different between the first and second periods of time.

In a symbol timing detector in accordance with the present invention, a correlator calculates a correlation value for a received radio packet signal. A peak detector compares the correlation value with a threshold value to be used, and sends, upon a correlation value detected larger than the threshold value, a detection signal to a symbol synchronous processor. A threshold value to be used for the peak detector is set different, after the first peak detected, between a predetermined estimation period and a period other than the former. A first peak is detected with a threshold value under a severer condition in the period other than the estimation period, and the next peak detection timing is estimated upon the first peak detected. A synchronization detecting position is determined, when no correlation peak is detected at the estimated timing, to output a sync detection signal.

Also, in accordance with the invention, a method of detecting synchronization includes the steps of obtaining a correlation value between a complex baseband signal represented in a complex number supplied, setting a first threshold value, comparing the correlation value to the first threshold value to thereby determine the first peak in the obtained correlation value, estimating a position following the first peak detected and an elapse of a predetermined period of time as a timing at which the next correlation peak comes periodically, setting a second threshold value based on the first peak detected, measuring time elapsing from the peak detected, and determining, when the time continues to be measured after the predetermined period of time has elapsed, synchronization to output a sync detection signal, and maintaining the second threshold value set, after the predetermined period of time has elapsed, in response to the peak detected and otherwise setting the first threshold value.

In accordance with the present invention, the method of detecting synchronization obtains a correlation value of a complex baseband signal to detect a first peak from the comparison thereof with a first threshold value, estimates the coming timing based on the detection, determines synchronization with a second threshold value, determines, when the measurement continues, synchronization to output a synchronization output signal, and otherwise sets the first threshold value, thereby making it possible to facilitate detection of correlation peaks after the first peak detected so as to eliminate failure in detection, and hence erroneous detection, of peaks.

BRIEF DESCRIPTION OF THE DRAWINGS

The objects and features of the present invention will become more apparent from consideration of the following detailed description taken in conjunction with the accompanying drawings in which:

FIG. 3 is a timing chart useful for understanding symbol timing synchronization detection based on correlation peak detection in the symbol timing sync detector.

DESCRIPTION OF THE PREFERRED EMBODIMENT

In the following, with the reference to the accompanying drawings, an embodiment of the synchronous detector will be described in detail in accordance with the present invention. The embodiment is directed to a synchronous detector in accordance with the invention applied in an OFDM demodulator 10. Components or parts not directly relevant to understanding the invention will be omitted from the drawings and description.

Figure 1:
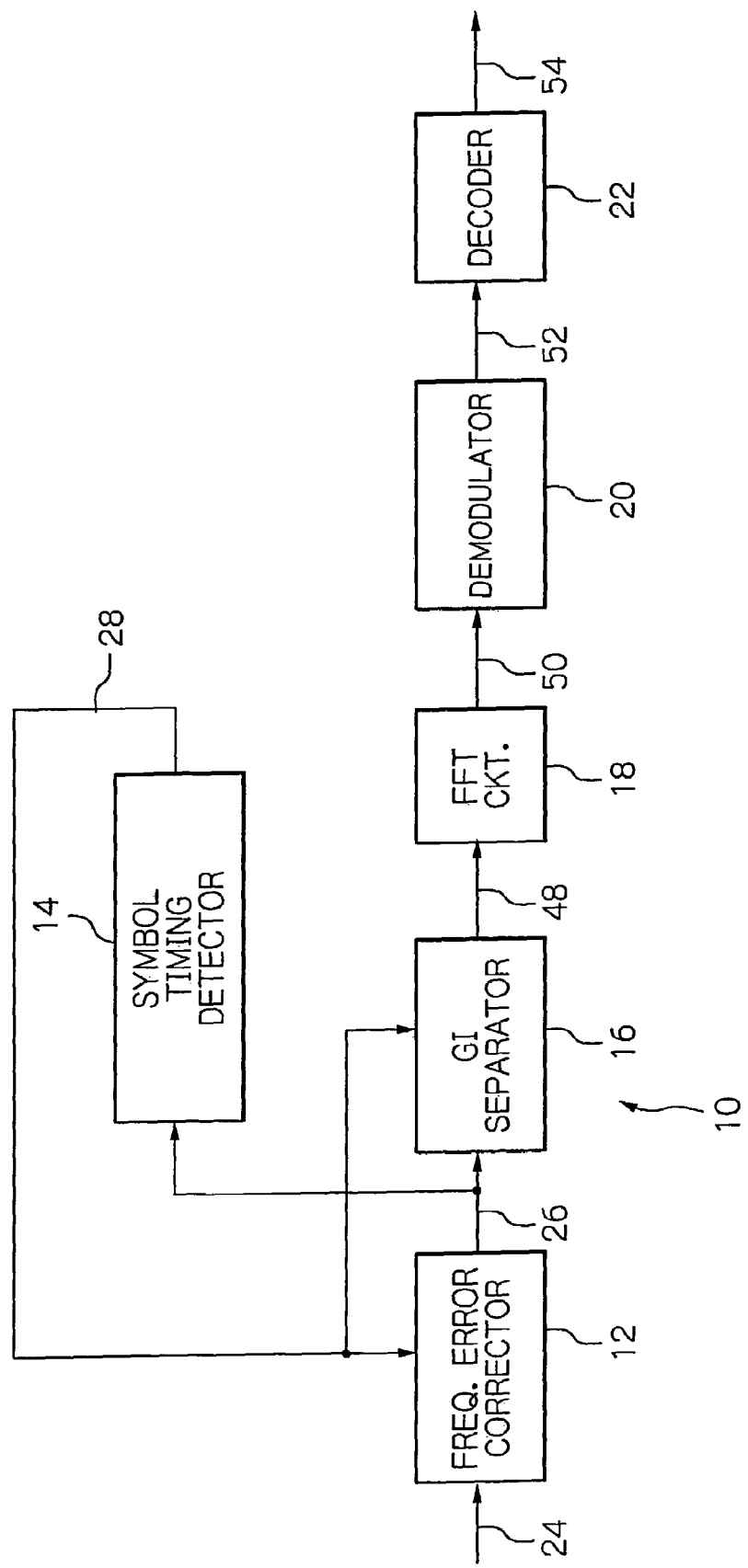
FIG. 1 is a schematic block diagram showing a symbol timing sync detector applied in an ODFM demodulator in a preferred embodiment of a synchronous detector in accordance with the present invention.

The OFDM demodulator 10, as shown in FIG. 1, includes a frequency error corrector 12, a symbol timing detector 14, a guard interval separator 16, a fast Fourier transform (FFT) circuit 18, a demodulator 20 and a decoder 22 interconnected as illustrated.

Although not shown in FIG. 1, but described in an article, Hideaki Matsue et al., "802.11 High-speed Wireless LAN Textbook", IDG (International Data Group) Japan, pp. 180-183, 2003, the OFDM demodulator 10 is adapted to receive a radio packet signal on an antenna and amplify the received packet signal at a low noise level. The received packet signal thus amplified at a low noise level is delivered to a first band-bass filtering (BPF) to pass a predetermined frequency band. The band-pass filtered packet signal is multiplied by an oscillated signal having a radio frequency handled by the OFDM demodulator 10. The received packet signal thus multiplied is further treated with a second band-pass filtering to limit its bandwidth. The received packet signal with its bandwidth thus limited is subjected to automatic gain control, and is thereafter quadrature-detected with a local signal almost close in frequency to a carrier wave to be converted into an analog baseband signal represented in a complex number. The analog complex baseband signal is converted into a digital complex baseband signal by analog-to-digital (A/D) conversion. Supplied into the frequency error corrector 12 is the digital complex baseband signal as an input signal 24. In the description, signals are designated with reference numerals on connections where they appear.

The frequency error corrector 12 has the function of correcting errors in the carrier frequency of the demodulator 10 and compensates difference in radio frequency between the transmitter and receiver sides with automatic frequency control. The frequency error corrector 12 uses this function to establish synchronization of the carrier frequency. The frequency error corrector 12 compensates with fine adjustment for frequency errors by means of the detected sync signal. The frequency error corrector 12 outputs the received packet signal 26 thus compensated to the symbol timing detector 14 and the guard interval separator 16.

The symbol timing detector 14 has the function of detecting timing synchronization in the demodulation on the basis of the received packet signal 26 and the symbol pattern signal stored in advance. The symbol timing detector 14 supplies the detected timing sync signal 28 to the frequency error corrector 12 and the guard interval separator 16.

Figure 2:
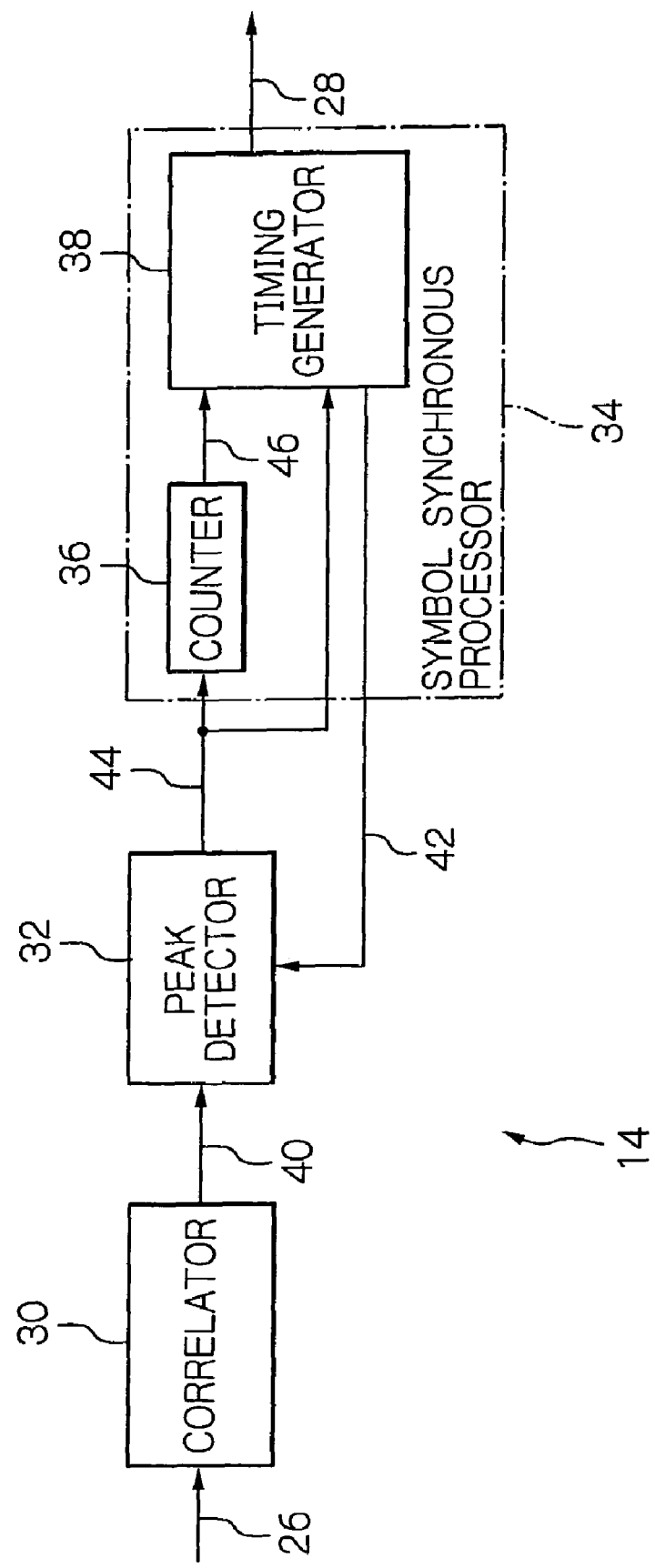
FIG. 2 is a schematic block diagram showing the symbol timing sync detector included in the OFDM demodulator shown in FIG. 1.

In more detail, the symbol timing detector 14, as shown in FIG. 2, includes a correlator 30, a peak detector 32 and a symbol synchronous processor 34, interconnected as illustrated. The symbol synchronous processor 34 comprises a counter 36 and a timing generator 38, interconnected as shown in the figure. The correlator 30 has the function of obtaining correlation between the received packet signal 26 and the pre-stored symbol, i.e. a pattern signal for a short preamble. This function can be implemented by a mutually correlative type of matched filter. The matched filter multiplies the received OFDM signal by a tap coefficient for every sample and accumulates the result of multiplication. The correlator 30 outputs the obtained correlation value 40 to the peak detector 32.

The peak detector 32 has a plurality of threshold values set therein, and has the function of comparing the correlation value 40 with a threshold value selected from the plurality of threshold values to detect a peak. The peak detector 32 selects one of the threshold values in response to a threshold selection signal 42 fed from the symbol synchronous processor 38. The peak detector 32 outputs a peak detection signal 44 to the counter 36 every time it detects a peak.

In addition, the way of setting a threshold value in the peak detector 32 is not confined to that described above. Alternatively, the peak detector 32 may be adapted to include a single register and the symbol synchronous processor 34 has a plurality of threshold values set therein, so that the peak detector 32 is responsive to a threshold supplying signal, instead of a threshold selection signal 42, to receive either of threshold values $S_A$ and $S_B$, FIG. 3, in dependence upon the number of times correlation peaks are detected.

As the threshold values $S_A$ and $S_B$, set are the best values obtained from simulation. In the simulation, the threshold values $S_A$ and $S_B$ are set under various signal-receiving conditions and, among the set of values thus set, a value is selected that brings about the best symbol timing synchronization. The ODFM demodulator is equipped with a best value determined in this way.

The symbol synchronous processor 34 has the function of detecting symbol timing synchronization in response to a peak detection signal 44 fed thereto. The counter 36 has the function of resetting itself in response to the peak detecting signal 44 fed thereto and thereafter incrementing. The counter 36 is adapted to increment in response to, for example, a positive-going edge of an input clock, not shown in the figures, to output a count 46 to the timing generator 38.

The timing generator 38 has a signal generating function for determining a condition for timing detection to generate a sync signal 28, and a selecting function for producing a threshold value selection signal 42. In the signal generating function, a state is detected in which the counter 36 is not reset, i.e. the counter 36 has its count 46 higher than a value corresponding to the estimated timing, to determine that a correlation peak has not been detected. The determination may be made based on comparison between a value corresponding to an estimated timing and a count 46 fed. The signal generating function, based on that determination, determines that a short preamble has been switched to a long preamble to output a sync signal 28. The selecting function counts a detection signal 44 fed for a correlation peak and outputs, based on its count, a threshold value selection signal 42 to be outputted. Specifically, the threshold value selection signal 42 is supplied to the peak detector 32 such that the threshold value $S_A$ or $S_B$ is selected when the count is zero or any of the values 1-10, respectively, with the illustrative embodiment.

Returning now to FIG. 1, the guide interval separator 16 has the function of removing a guard interval (GI) contained in a received packet signal in response to the symbol timing sync signal 28 supplied therewith. The guard interval separator 16 outputs the received packet signal with its guide interval removed to the FFT circuit 18.

The FFT circuit 18 has the function of transforming information in time domain into information in frequency domain. With this function, the FFT circuit 18 generates multiple carriers 50 in a batch from the received packet signal 46 fed thereto to output them to the demodulator 20.

The demodulator 20 has the function of receiving the multiple carriers 50 thus fed to execute channel estimation, channel equalization, phase tracking and demodulation of sub-carriers in turn. The channel estimating function estimates the phase and amplitude of each sub-carrier distorted over the propagation path under the multiple path environment. The channel equalizing function uses the estimated distortion on the propagation path to equalize the channel to output an equalized result to the phase tracking function. The phase tracking function accurately detects the stationary phase rotating with time and compensates for it. The sub-carrier demodulating function demodulates out the respective sub-carriers from the signal thus corrected in phase. The demodulator 20 outputs the respective sub-carriers 52 thus obtained to the decoder 22.

The decoder 22 has the function of using an intermediate value based on the phase and amplitude of the received signal to determine the signal components for an I channel and a Q channel, restoring the stream of received data to original, and decoding an error correcting code by using, for example, Viterbi algorithm. The decoded signal is passed as received data 54 to an upper layer.

Next, an operation of the symbol timing sync detector in the OFDM demodulator will be described. The correlator 30 is supplied with a received packet signal 26 in the form of the complex baseband signal. The received packet signal 26, as shown in FIG. 3, line (a), includes a short preamble 60 and a long preamble 62 followed by a data field 64. The short preamble 60 includes 10 short symbols S1-S10, but in FIG. 3, line (a) there are shown the last symbols S8, S9 and S10. Essentially, the received packet signal 26 has its guide interval provided at the head of the long preamble 62, while in FIG. 3, line (a) the guide interval is omitted and there are shown only two long symbols L1 and L2. Also, the data field 64 includes the guide interval at its top, and its SIGNAL field and guide interval are also omitted from the figure. The SIGNAL field defines the transmission rate and the data quantity.

The corrlator 30 obtains complex correlation based on the received packet signal 26 and a short preamble pattern stored beforehand and outputs the correlation values 40 calculated in turn to the peak detector 32. Only for description purpose, an operation result shown in FIG. 3, line (b) is obtained by the correlator 30.

The peak detector 32 is provided with threshold values $S_A$ and $S_B$ set therein, and selects either of the two in response to the threshold selection signal 42 supplied. The peak detector 32 compares the set threshold value to the correlation value 40 supplied, and outputs, when it receives the correlation value 40 equal to or larger than the threshold value, a correlation peak detection signal 44 to the counter 36.

The counter 36 is reset to its predetermined initial value, zero with the embodiment, in response to the correlation peak detection signal 44 thus provided, and increments in response to a clock input thereafter. The counter 36 outputs its count 46 to the timing generator 38.

Now, when the propagation path is in its good state, the peak detector 32 detects a correlation peak in correspondence with the repetitive period of symbols in the short preamble. This means that, once a correlation peak is detected, it is possible to estimate the timing at which the next correlation peak is detected since the length of a symbol is regulated with a format and symbols are periodically supplied. The timing generator 38 utilizes that feature to perform comparison with output requirements for generating timing to output a symbol timing sync signal 28. The timing generator 38 in accordance with the embodiment is responsive to the correlation peak detection, to determine that the count included in the counter 36 does not come to zero but still continues to increment, to thereby determine that the short preamble 60 is switched to the long preamble 62 at the correlation peak immediate before the current one, outputting a symbol timing sync signal 28.

Further, the timing generator 38 includes a peak counter not shown in the figures. The peak counter is adapted to count detection signals 44 supplied from the peak detector 32 and resets itself in response to the symbol timing sync signal 28 outputted. The timing generator 38 comprises a signal generating function, not shown in the figures, which generates a threshold selection signal 42 on the basis of the count. In more detail, the signal generating function generates a threshold selection signal 42 such that the threshold value $S_A$ is selected in the period from the start of receiving signals, having detected no correlation peak, to the time of a correlation peak first detected, i.e. while the peak count is zero, that the threshold value $S_B$ is selected in the period corresponding to the timing estimated with any of the peak counts 1-10 and to the timing estimated in one cycle of estimation, and that otherwise the threshold value $S_A$ is selected for the timing estimated with a peak count. This means that importance is placed upon facilitating the detection by checking correlation peaks under a severer condition at the beginning, and relying, once having detected a peak, upon the result from the foregoing checking with the threshold value $S_A$ to use the lower threshold value $S_B$ in detecting correlation peaks in the thus estimated range.

FIG. 3, line (b) shows that the peak detector 32 detects a first correlation peak at time T1 in response to the selection of the threshold value $S_A$ from the threshold value selection signal 42, and that the detector 32 is thereafter responsive to the selection of the threshold value $S_B$ from the threshold selection signals 42 during the period from time T2 to time T4. This results in a correlation peak detected at time T3 following the time T2, and the timing generator 38 therefore determines, in the instant case, that time T2 is not appropriate for the timing for switching. Since a correlation peak is not detected during the period from the time T3 to the time T4, the count is incrementing, whereby the timing generator 38 determines that time T3 is a synchronous timing and outputs a symbol timing sync signal 28.

As seen from the operation described above, the timing sync detector 14, once it receives the received radio packet signal 26, can securely detect the symbol timing synchronization. After the synchronization detection, the symbol timing detector 14 can establish synchronization at the detected timing, and therefore sufficiently provide the circuit components in the system with the synchronous timing thus established.

By contrast, in FIG. 3, line (c), the switching timing is determined on the basis of the threshold value $S_A$ only in a conventional manner. In that case, the correlation peak detected at the time T2 reveals that the time T1 is not a synchronous timing. When a correlation value for the tenth symbol of the short preamble 62 is lower than that of the other symbols due to the conditions of the propagation path, a correlation peak cannot be detected at the time T3. This means a failure of peak detection. A timing generator thus erroneously determines that the time T2 is a synchronization timing, resulting in erroneous synchronization detection.

With the illustrative embodiment, however, the correlation value at time T3 larger than the threshold value $S_B$ causes a correlation peak to correctly be detected. In this way, even when the conditions of the propagation path worsen more or less to lower the correlation value, the symbol timing detector 14 can detect the correlation peak with high accuracy in the peak detector 32 to establish correct timing synchronization.

The operation described above makes it possible to reduce erroneous detection of symbol timing that would otherwise be caused by failure to detect correlation peaks, resulting in improved accuracy in symbol timing synchronization detection.

In summary, with the illustrative embodiment of the symbol timing synchronous detector 14 in the OFDM demodulator 10 described above, the correlator 30 calculates a threshold value 40 for the received radio packet signal 26, and the peak detector 32 compares the calculated correlation value 40 with a threshold value used and determines that a correlation peak has been detected based on the correlation value larger than the threshold value to sends a detection signal 44 to the symbol synchronous processor 34. The symbol synchronous processor 34 sets a threshold value for the peak detector 32 in such a way that, after the detection of the first peak, use is made of threshold values different from each other between a predetermined estimation period and the period other than the former, compares the correlation value with a threshold value set with severe requirements in the period other than the predetermined estimation period to then detect a first peak, estimates on the basis of the detection the next peak detection timing. In a predetermined period of time until the thus estimated timing, the different threshold value is set to facilitate the detection of a correlation peak as well as to reduce failure to detect a peak to output a sync detection signal, thereby making it possible to reduce erroneous detection of peaks and heighten the accuracy in detection of symbol timing synchronization.

The symbol synchronous processor 34 sets a threshold value to be used for the first peak detection in a period other than the predetermined estimation period to a value larger than the threshold value for the predetermined estimation period to thereby require higher correlativity for the first peak detection in order to execute peak detection under a stricter condition, thereby making it possible to eliminate a failure in peak detection during the predetermined estimation period, i.e. during the symbol period in the short preamble 60.

Further, the symbol synchronous processor 34 includes the counter 36 and the timing generator 38. The counter 36 resets its count in response to detection of correlation peaks and increments after reset, while the timing generator 38 determines a synchronization detecting position on the basis of whether or not the counter 36 increases its count at the estimated timing, outputs a sync detection signal, determines either of the predetermined estimation period and a period other than the predetermined estimation period according to the number of correlation peaks detected, and sets a threshold value corresponding to the determined result. Thereby, a condition is set such as to facilitate peak detection, while determination is made, from the count value continuing to increase at the estimated position, on the situation in which it is impossible to detect correlation peaks to output the peak position immediate before the current one as a synchronization detection position, so that reliable synchronization detection can be accomplished.

It is preferable that a plurality of threshold values are provided in either of the peak detector 32 and the symbol synchronous processor 38 and that the symbol synchronous processor 38 outputs the peak detector 32 with either of a selection signal and a supply signal on the basis of the threshold values thus provided.

According to the illustrative embodiment, the synchronization detecting method obtains a correlation value of a complex baseband signal to detect a first peak from comparison thereof with a threshold value $S_A$, estimates a timing coming based on the detection, detects synchronization with a threshold value $S_B$, outputs a synchronization output signal indicative of synchronization detected in the continued measurement, and sets it to a threshold value $S_A$ under the detection condition other than described above, thereby making it possible to facilitate detection of correlation peaks after having detected the first peak so as to eliminate failure to detect peaks and thus erroneous detection of peaks. It is preferable to set the threshold value $S_A$ to a value larger than the threshold value $S_B$.

The entire disclosure of Japanese patent application No. 2004-117463 filed on Apr. 13, 2004, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A synchronous detector detecting a boundary position between a short preamble including symbols forming a specific pattern and a long preamble used in channel estimation as symbol synchronization timing, said synchronous detector, comprising:
    an arithmetic circuit for receiving a complex baseband signal represented in a complex number and for obtaining a correlation value between the complex baseband signal and a pre-stored pattern signal positioned at a top of the complex baseband signal;
    a peak detector for comparing the correlation value to a threshold value which is to be used among a plurality of threshold values, and for determining, when one of the correlation values is detected which is larger than the threshold value to be used, a peak of the correlation values; and
    a synchronization determining circuit operative in response to the peak determined for estimating a timing at which a peak of the correlation values comes next, and for monitoring determination of a peak of the correlation values at the timing estimated to determine a synchronization timing with the pattern signal to output a sync detection signal,
    wherein the threshold value to be used is set to a value under a severer condition in a first period of time than in a second period of time, the second period of time extending from the peak determination to an elapse of a predetermined period of time, and the first period of time being a time period other than the second period of time, whereby the threshold value to be used is different between the first and second periods of time.

2. The synchronous detector in accordance with claim 1, wherein said synchronization determining circuit sets the threshold value to be used for the first period of time to a value larger than the threshold value to be used for the second period of time.

3. The synchronous detector in accordance with claim 1, wherein said synchronization determining circuit comprises:
    a measuring circuit for resetting itself in response to the determination of the peak and incrementing, after reset, to output a count; and
    a timing determining circuit for determining a synchronization detecting position based on whether or not the count increases at the timing estimated to output the sync detection signal, and determining either of the first period and the second period according to the number of the peaks determined to set the threshold value to be used to a value accordingly.

4. The synchronous detector in accordance with claim 3, wherein the plurality of threshold values are included in either of said peak detector and said synchronization determining circuit, said synchronization determining circuit providing said peak detector with either of a selection signal and a supply signal according to which of said peak detector and said synchronization determining circuit includes the plurality of threshold values.

5. A method of detecting a boundary position between a short preamble including symbols forming a specific pattern and a long preamble used in channel estimation as symbol synchronization timing, comprising the steps of:
    receiving a complex baseband signal represented in a complex number and obtaining a correlation value between the complex baseband signal and a pre-stored pattern signal positioned at a top of the complex baseband signal;
    setting a first threshold value;
    comparing the correlation value to the first threshold value to thereby determine a first peak in the correlation value obtained;
    estimating a position following the first peak detected and an elapse of a predetermined period of time as a timing at which a next peak of the correlation value comes periodically;
    setting a second threshold value based on the first peak detected;
    measuring time elapsing from the peak detected, and determining, when the time continues to be measured after the predetermined period of time has elapsed, synchronization to output a sync detection signal; and
    maintaining the second threshold value set, after the predetermined period of time has elapsed, in response to the peak detected and otherwise setting the first threshold value.

6. The method in accordance with claim 5, wherein the first threshold value is larger than the second threshold value.

* * * * *